United States Patent [19]

Volk, Jr. et al.

[11] Patent Number: 5,332,311
[45] Date of Patent: Jul. 26, 1994

[54] LIQUID SCALE AND METHOD FOR LIQUID INGREDIENT FLUSH THEREOF

[75] Inventors: Joseph A. Volk, Jr., Creve Coeur; Mark R. Kniepmann, Florissant; Thomas M. Harvengt, St. Louis, all of Mo.

[73] Assignee: Beta Raven Inc., Earth City, Mo.

[21] Appl. No.: 774,699

[22] Filed: Oct. 9, 1991

[51] Int. Cl.[5] .................. B01F 15/02; B01F 15/04
[52] U.S. Cl. .................... 366/134; 366/138; 366/141; 366/152; 366/177; 366/189; 222/148
[58] Field of Search .............. 366/134, 138, 141, 189, 366/152, 162, 177, 180, 181, 186, 187; 222/148; 134/166 R, 169 R

[56] References Cited

U.S. PATENT DOCUMENTS

| | | | |
|---|---|---|---|
| 1,526,001 | 2/1925 | La Rue | 222/148 |
| 2,653,733 | 9/1953 | Rudd | 222/148 |
| 2,679,374 | 5/1954 | Mylting | 366/141 |
| 2,802,599 | 8/1957 | Callahan | 222/148 |
| 2,869,328 | 1/1959 | Gibson | 134/166 R |
| 3,245,361 | 4/1966 | Enoch | 366/189 |
| 3,764,041 | 10/1973 | Noll | 222/148 |
| 3,804,300 | 4/1974 | Cox | 222/148 |
| 3,901,444 | 8/1975 | Maltbie | 222/148 |
| 4,324,494 | 4/1982 | Pryor | 222/148 |
| 4,433,917 | 2/1984 | Mendel | 366/141 |
| 4,549,676 | 10/1985 | Gerich | 222/148 |
| 4,667,503 | 5/1987 | Loos | 366/141 |
| 4,714,053 | 12/1987 | Perry | 134/166 R |
| 4,714,179 | 12/1987 | Otterstetter | 222/148 |
| 4,856,544 | 8/1989 | McConnell | 134/902 |
| 4,863,277 | 9/1989 | Neal | 366/141 |
| 4,905,325 | 3/1990 | Colditz | 134/169 R |
| 4,941,596 | 7/1990 | Marty | 222/148 |
| 4,960,142 | 10/1990 | Robb | 134/166 R |

FOREIGN PATENT DOCUMENTS 0150823  8/1985  Japan ................. 366/141

Primary Examiner—Timothy F. Simone
Assistant Examiner—Randall E. Chin
Attorney, Agent, or Firm—Rogers, Howell & Haferkamp

[57] ABSTRACT

A liquid weigh scale hopper receives a plurality of liquid ingredients for dumping into a receiver/mixer and includes a pair of high flow rate spray nozzles near the top thereof for spraying chilled water into the hopper. As a discharge valve at the bottom of the hopper is opened, chilled water is sprayed into the hopper and fills it to create a gravitational pressure head helping to force the liquid batch out of the hopper.

40 Claims, 2 Drawing Sheets

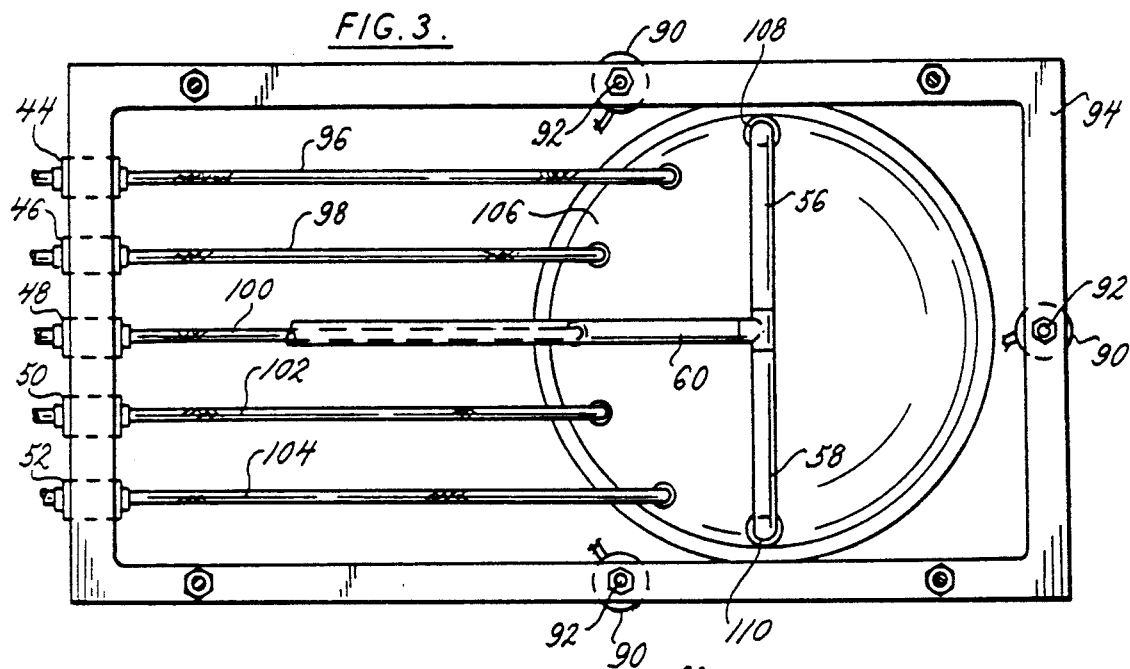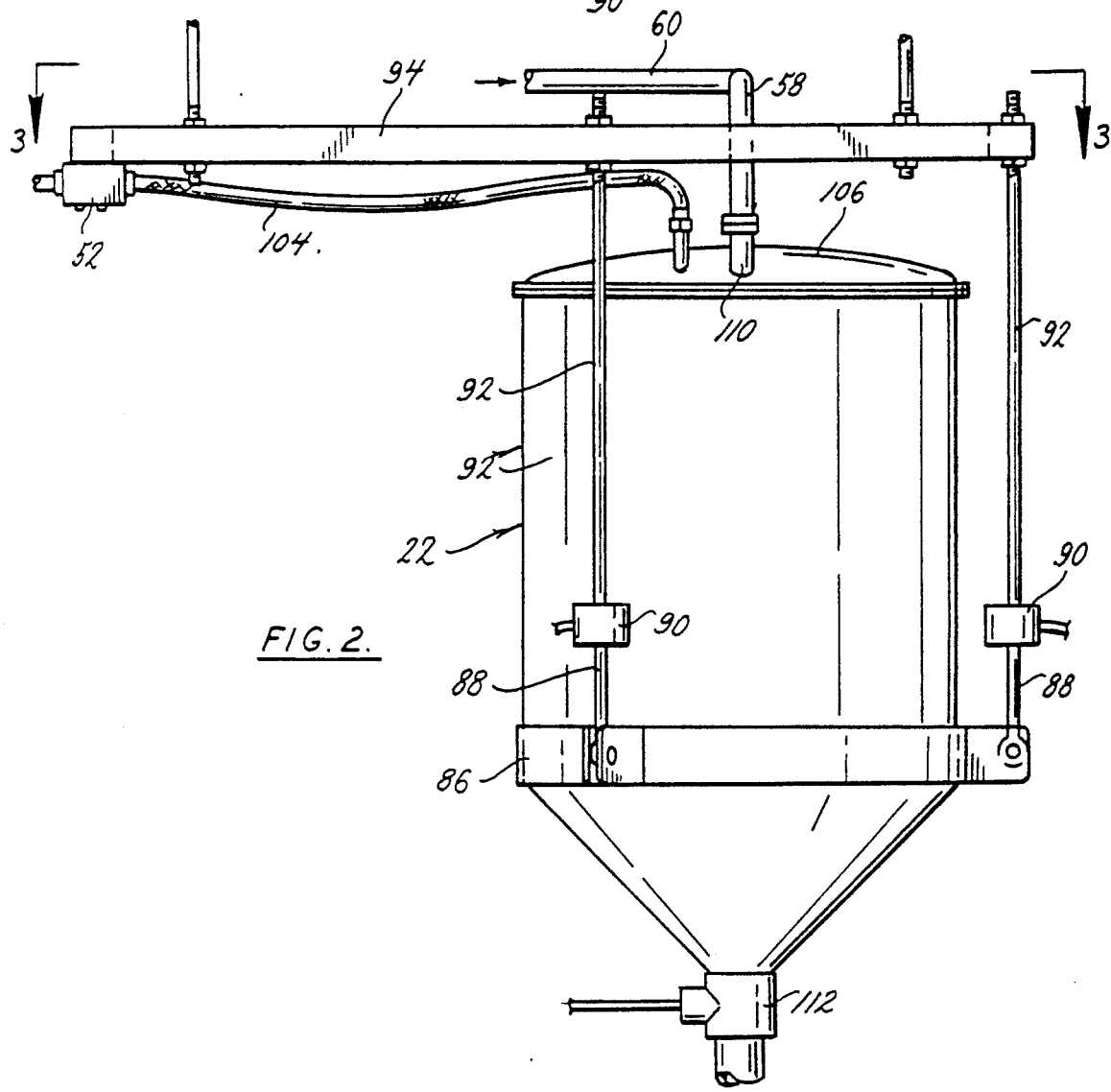

5,332,311

LIQUID SCALE AND METHOD FOR LIQUID INGREDIENT FLUSH THEREOF

BACKGROUND AND SUMMARY OF THE INVENTION

For many years, large commercial bakeries have manually prepared batches of ingredients for mixing into large "doughs". These batches which are pre-mixed typically include liquid batches of several ingredients. These ingredients include soy oil, di-malt, yeast, fructose, honey, refiner's syrup, vinegar, and lecithin. These ingredients, along with the dry ingredients of mainly flour, are mixed in large mixers before being further processed into smaller loaves for the baking of bread and other similar bakery products. As an example, for bread, a first set of liquids comprising soy oil, di-malt, water and yeast are added to a "sponge dough" as the materials are first mixed. This sponge dough is then permitted to rise in a dough room before being further processed in a second mixer with a second batch of liquid ingredients comprising liquid sugar (fructose), honey, refiner's syrup (molasses), vinegar, di-malt, lecithin, yeast, and water. In the prior art, these liquid ingredients comprising these two batches (except for water) were hand measured into a bucket which would then be manually dumped into the mixer at each of the two above-described stages of the baking process.

This hand preparation and mixing of liquid ingredients at these two stages of the baking process was very inexact. The amount of each ingredient actually added to the bucket depended entirely upon the measurement made by the operator. Additionally, even if the operator were to make very exacting measurements, a not insubstantial amount of residue remained in the bucket after it was dumped into the mixer. Furthermore, the composition of this residue was inexact and varied from mix to mix such that it could not be adequately accounted for. It should also be noted that the water component of these liquid additions was not actually put in the bucket due to the fact that substantially more water is added at each of these two liquid additions than could be conveniently handled in the bucket. For example, in a typical baking process for bread or the like, 50-60 lbs. of liquid ingredients other than water could be required while the water component might be as much as 400 lbs. Therefore, in the prior art manual process, considerable inaccuracy existed in the addition of liquid ingredients which produced a variation in the product produced by the baking process.

This problem became even more acute as the inventors herein participated in an effort to automate the baking process. As can be appreciated, the liquid ingredients which comprise the liquid batch range from being quite viscous to oil based and even water soluble in nature. With this composition, pre-mixing of a batch of liquid ingredients in a scale hopper or the like might be readily anticipated to be a correct approach to solving this problem. However, getting this liquid batch to dump into the mixer at the appropriate point in time in a full and complete manner and in a reasonably short period of time proved to be quite a challenge. Not only did the sticky liquid batch tend to resist ready flow into the mixer, it also had a tendency to clog any reasonably sized opening in the bottom of the liquid scale and/or the delivery tube connecting the hopper to the mixer. Some of the ingredients, such as molasses, even left residue inside the delivery tube, thereby giving a visual indication that not all of the ingredients were making it to the mixer. Additionally, it was anticipated that the liquid scale and delivery tube must be flushed with hot water between batches in order to clean it and prevent its contaminating successive batches of liquid ingredients. However, this would require additional plumbing, the provision of hot water, the wasted use of an excessive amount of water, and interruption of the continuous baking process should there be any malfunction.

In order to solve these and other problems in the prior art, the inventors herein have succeeded in designing and developing a liquid weigh scale hopper and water flush arrangement which permits a batch of liquid ingredients to be prepared and then flushed completely into a mixer while leaving virtually no residue in the hopper or delivery tube. This is achieved by spraying the chilled water liquid ingredient into the hopper such that it fills it without overflowing to gravitationally help push the liquid batch out of the hopper and flush it while doing so. The liquid hopper is typically sized to hold approximately 180 lbs. of liquid ingredients. As mentioned above, the liquid ingredients comprising a typical batch would range from 50-60 lbs. This permits the liquid scale to be loaded to its maximum with an additional 120-130 lbs. of water whose weight helps force the liquid ingredients out through a valve located at the bottom of the hopper. Additionally, the water dilutes the top portion of the liquid ingredient batch which helps eliminate any residue which might form into a ring around the inside of the liquid scale at its fill line, as well as facilitating the flushing of the last portion of the liquid batch out of the hopper and through the delivery tube. Even after the scale is maximally loaded with water, in a typical mix of 400 lbs. of water, another 250 lbs. or more of water is then sprayed against the inside of the hopper and ensures a substantially clean flush of the inside thereof.

As can be appreciated, it is perhaps more difficult to achieve a complete flush and clean of the delivery tube extending between the scale hopper and the mixer than it is to flush and clean the scale hopper itself. In the scale hopper, in a typical flush, there is quite a turbulence of water and liquid ingredients which is created when water is first sprayed into the hopper. Secondly, as the liquid ingredients and water drain from the hopper, the water spray directly contacts the sidewalls and bottom of the hopper to further scour and cleanse the hopper. By way of contrast, there is no spray action which contacts the inside of the delivery tube. Furthermore, the liquid ingredients are squeezed into the delivery tube such that there is a significant contact surface therebetween which increases the tendency for the ingredients to leave a residue. Lastly, the velocity of the flushing water through the delivery tube begins at a rather slow rate but then accelerates. Therefore, there was significant doubt that the present invention would achieve a clean and complete flush of liquid ingredients not only through the scale hopper, but perhaps more importantly through the delivery tube connecting the scale hopper to the mixer itself.

With this approach, the chilled water which is typically added at 40° F. will achieve the desired dump and flush of the liquid scale hopper and delivery tube whereas as in the prior art it was anticipated that hot water would be required to adequately flush and clean them. Therefore, using the liquid ingredient water eliminates the requirement for separate plumbing and the provision of hot water to clean out the inside of the liquid hopper and its delivery tube between batches. This unique arrangement and method represents a dramatic improvement over the manual methods utilized in the prior art and also facilitates the automation of this batching process.

While the principal advantages and features of the present invention have been mentioned above, a greater understanding may be attained by referring to the drawings and description of the preferred embodiment which follow.

BRIEF DESCRIPTION OF THE DRAWINGS

FIG. 2 is a side view of the liquid scale hopper as supported from a framework by a plurality of load cells; and FIG. 3 is an overhead view taken along the plane of line 3—3 of FIG. 2 of the liquid scale hopper and supporting framework.

DETAILED DESCRIPTION OF THE PREFERRED EMBODIMENT

Figure 1:
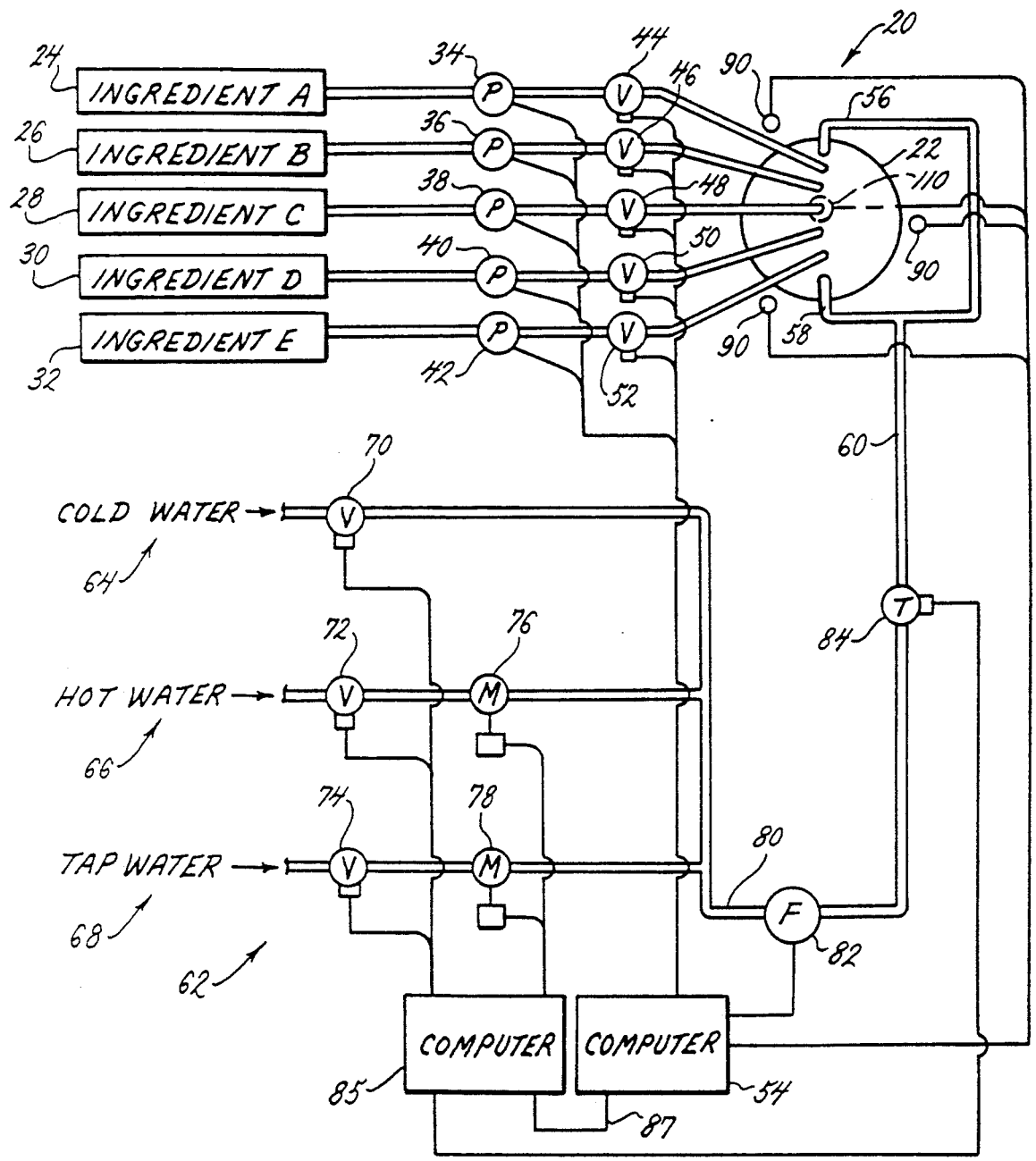
FIG. 1 is a diagrammatic view of the liquid scale hopper flush and clean system of the present invention.

As shown in FIG. 1, the liquids system 20 of the present invention has at its heart a liquid scale hopper 22 which receives any one or more of liquid ingredients 24-32 as the ingredients are pumped by pumps 34-42 through on/off solenoid valves 44-52. The ingredients 24-32 are identified in FIG. 1 as ingredients A-E and they may be any combination or recipe as required for the particular baking process being performed. For example, in making bread, there will typically be a first liquid system 20 at a sponge dough mixer which adds in soy oil (or canola oil), di-malt and liquid yeast. At a second station, after the sponge dough has been prepared and permitted to rise before being placed in a second mixer, the liquid ingredients would typically include liquid sugar (fructose), honey, refiner's syrup (molasses), vinegar, di-malt, lecithin, and liquid yeast. Of course, these particular ingredients are merely exemplary of other liquid ingredients which could be conveniently utilized using the present invention. Furthermore, as this liquids system 20 is centrally controlled by a main computer 54 or other programmed logic controller, the liquid ingredients 24-32 may be conveniently changed from batch to batch in accordance with the particular recipe for the product being made.

At either side of the top of the liquid scale hopper 22 there is shown chilled water inlets 56, 58 which are supplied from a common water line 60. This common water line 60 carries chilled water produced by a chilled water system 62. The chilled water system 62 includes a cold water source 64, a hot water source 66, and a tap water or city water source 68 which supplies water through an on/off solenoid valve 70-74, with the hot water source 66 and tap water source 68 being further controlled by modulating valves 76-78. Water from each of these water sources 64-68 is collected into a common water line 80, the flow through which is monitored by a flow valve 82 and the temperature of which is sensed by an electronic temperature sensor 84. As shown in FIG. 1, a second computer 85 senses and controls the various electronic components including valves 70-74, modulating valves 76-78, and temperature sensor 84. The first computer 54 controls the flow of liquid ingredients into the hopper 22 and then calls for chilled water over a data link 87, as required for the dump and flush operation. Flow of chilled water is monitored by first computer 54 by sensing the output of flow meter 82 so as to know when enough chilled water has been delivered.

Computer 85 is programmed to sense the output temperature of the chilled water by electronic temperature sensor 84 which will yield a temperature either above or below the desired water temperature. Cold water from cold water source 64 is generally colder than the desired temperature of the chilled water such that there is no requirement for a modulating valve in its line. Thus, cold water from cold water source 64 is normally either on or off as the chilled water system 62 is either on or off. In order to raise the temperature of the cold water to approach the desired temperature of the chilled water, the modulating valve 78 is throttled open to add city tap water from any potable water source available at the particular installation. The modulating valve 78 is opened up to as much as approximately 80% in an effort to achieve the desired chilled water temperature. If the chilled water temperature is still below desired temperature, then hot water is added from hot water source 66 by throttling open modulating valve 76. For most installations, it has been found that in the summertime the chilled water temperature of a nominal 40° F. may be achieved by using the cold water source and the city tap water source. However, in wintertime, it has been found that hot water from hot water source 66 is also required in order to achieve a 40° F. chilled water temperature.

It should be noted that for the particular baking process being described as the preferred embodiment, the chilled water system is designated as such because water at 40° F. is being supplied for the baking process. However, it should be understood by those of ordinary skill in the art that different baking processes require water at different temperatures. For example, in some baking processes water at 90° is required. In those instances, the "chilled" water system disclosed herein could very simply be converted to provide water at the desired temperature by simply rearranging the water sources. For example, one such simplistic arrangement would include swapping the hot water source with the cold water source such that hot water would enter the system at full pressure and flow, tap water would be throttled in as necessary to modulate hot water temperature, and then cold water used to the extent that tap water would not adequately modulate the temperature to the desired value, much as in the manner disclosed herein. Such variations on the present "chilled" water system are within the scope of the disclosure of the present system. Undue emphasis should not be placed on the designation of the water system as "chilled".

Referring now to FIGS. 2 and 3, the liquid scale hopper 22 is secured to a collar 86, collar 86 being suspended by a plurality of support rods 88 attached to load cells 90 which are themselves supported by rods 92 from a supporting framework 94. Load cells 90 provide a continuous indication of the weight of the liquid scale hopper 22 and its contents. A plurality of feed lines 96-104 are individually connected to the top 106 of liquid scale hopper 22 for individually feeding liquid ingredients thereto, as has been previously explained. Solenoid valves 44-52 control the flow of liquid ingredient through each of the fill lines 96-104. A chilled water supply line 60 feeds chilled water inlets 56, 58 at the opposite sides of top 106 with high flow rate spray nozzles 108, 110. High flow spray nozzles 108, 110 may be Bete Model TF40XW316 and TF40FC316 to accommodate a high flow spray of chilled water against the inside of the liquid scale hopper and across substantially the entire surface of any liquids contained therein. Alternately, high speed spray nozzles 108, 110 may not be required as a great deal of turbulence is created in the hopper when the water is supplied at a high flow rate. Instead, the water inlets 56, 58 may merely be flanged into the top 106 and the end openings be simple pipe ends. As shown in FIG. 2, the bottom of liquid scale hopper 22 funnels into a discharge valve 112 which may be a nominal two inches in diameter to control the dumping of liquid ingredients from liquid scale hopper 22 through delivery tube 114 into a receiver/mixer (not shown) or the like. Each of load cells 90 and the discharge valve 112 is connected to computer 54.

In operation, liquid ingredients as are desired are individually fed into the liquid scale hopper. As each liquid ingredient is fed in, the incremental increase in weight as measured by the load cells help the main computer to determine and control the amount of each ingredient in order to satisfy the desired recipe therefor. Thus, with this arrangement, the individual liquid ingredients may be added by weight to the batch. The order that the liquid ingredients are fed into the liquid scale hopper may also be controlled to aid in flushing the liquid batch. Generally, the inventors have found that it is easier to flush the liquid batch if the more slippery and less viscous ingredients are first fed into the liquid scale hopper, while the other, stickier, more viscous ingredients are fed last. After the liquid batch has been prepared with the various liquid ingredients, it is held in place for dumping as called for by the main computer logic controller. At that time, the discharge valve is opened and the chilled water supply is turned on to spray chilled water into the liquid scale hopper from opposite sides thereof and across the top of the liquid batch.

The inventors have found that there is a time delay before there is any flow of liquids from the liquid scale hopper during which the chilled water has a tendency to fill the liquid scale hopper. In a typical application, 50–60 lbs. of liquid ingredients are loaded into the liquid scale hopper, and the liquid scale hopper may have a capacity of 180 lbs. which permits approximately 125 lbs. of chilled water to be sprayed into the liquid scale hopper. This spraying action creates quite a lot of turbulence in the hopper which scours out the hopper as it is filled. When the liquid scale hopper reaches its maximum weight as measured by the load cells, the chilled water supply is turned off in order to avoid overfilling. This approximately 125 lbs. of chilled water creates a pressure head through gravitational forces which helps to push the liquid batch through the discharge valve and delivery tube, and into the receiver or mixer. As flow commences through the discharge valve, the inventors have observed that the discharge rate exceeds the chilled water spray rate so that the hopper slowly empties as more chilled water is added which again scours out the hopper and dilutes the portion of the liquid batch near its top surface. As can be appreciated, this also facilitates the ready flow of the last portion of the liquid batch and helps eliminate any ring of residue around the interior sidewall of the liquid scale hopper and in the delivery tube.

As approximately 400 lbs. of chilled water is utilized in the specific application being discussed herein, after the initial 125 lbs. of chilled water has been loaded into the liquid scale hopper, there remains another 275 lbs. of chilled water which is sprayed thereinto and which helps to not only flush out the remainder of the liquid batch, but also helps to cleanse the inside walls thereof. Thus, not only is the entire batch reliably added to the receiver or mixer, but the interior of the liquid scale hopper and delivery tube is flushed clean so that there is no contamination between batches. This is especially important in those applications where different batches of liquid ingredients are required in order to make up different variations of bakery products. This might be the case in a bakery making bread where different kinds of bread are being made such as whole wheat, white, etc.

It is noted that while the liquid ingredients comprising the liquid batch are measured by weight into the liquid scale hopper, the chilled water is measured by flow (volume) which helps to reduce the required size of the liquid scale hopper as the liquid scale hopper need not be of sufficient capacity to hold all of the chilled water in addition to the liquid ingredients comprising the liquid batch.

However, in some applications it may be desired to have a liquid scale hopper large enough to hold all of the ingredients, including the chilled water. In this embodiment, the chilled water would be sprayed in last and could be measured in by weight using the load cells which support the hopper. Although the inventors have not tried this embodiment, it is believed that a clean dump and flush of the hopper and delivery tube would be achieved with this arrangement.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In an industrial process system having means for preparing a batch of ingredients for a foodstuff, said batch comprising a large number of servings of said foodstuff, the improvement comprising a hopper, said hopper having a discharge, means for feeding a measured amount of each of a plurality of liquid ingredients into said hopper, and means for flushing substantially all of said pre-fed liquid ingredients out of said hopper discharge with a liquid ingredient.

2. The device of claim 1 further comprising means for preventing the overfilling of said hopper.

3. The device of claim 2 further comprising a delivery tube connected to said hopper discharge for carrying said flushed liquid ingredients to a mixer, said flushing means including means for flushing all of said liquid ingredients through said delivery tube and into said mixer to substantially eliminate the deposition of any residue in said delivery tube.

4. The device of claim 1 wherein said flushing means comprises at least one spray opening situated in said hopper to spray said flushing liquid into said hopper.

5. The device of claim 4 wherein said liquid ingredient for flushing said hopper is a different ingredient than any of said plurality of liquid ingredients.

6. The device of claim 5 wherein said feeding means further comprises means for measuring each of said plurality of liquid ingredients by weight.

7. The device of claim 6 wherein said measuring means comprises means for monitoring the weight of said hopper.

8. The device of claim 7 further comprising a support for said hopper, and wherein said weight monitoring means comprises at least one load cell connected between said support and said hopper.

9. The device of claim 8 wherein at least some of said plurality of liquid ingredients have a viscosity substantially greater than the viscosity of said flushing liquid ingredient.

10. The device of claim 9 wherein said flushing liquid ingredient is water.

11. The device of claim 10 wherein said plurality of liquid ingredients is taken from a group comprising oil, malt, and yeast.

12. The device of claim 4 wherein two spray openings are situated in the top of said hopper, said spray openings being positioned to spray said flushing liquid ingredient across a substantial part of said hopper interior.

13. The device of claim 12 further comprising a spray nozzle situated at each spray opening through which said flushing liquid ingredient flows.

14. The device of claim 6 wherein said flushing liquid ingredient is measured by a flow meter, the amount of said flushing liquid ingredient being substantially greater than all of said plurality of liquid ingredients.

15. The device of claim 14 wherein said flushing liquid ingredient is water.

16. The device of claim 15 wherein said plurality of liquid ingredients is taken from a group comprising oil, malt, and yeast.

17. The device of claim 15 wherein said plurality of liquid ingredients is taken from a group comprising liquid sugar, honey, refiner's syrup, vinegar, malt, lecithin, and yeast.

18. The device of claim 10 wherein said plurality of liquid ingredients is taken from a group comprising liquid sugar, honey, refiner's syrup, vinegar, malt, lecithin, and yeast.

19. An industrial process system for preparing a batch of food ingredients, said process system including a hopper for pre-mixing a batch of liquid ingredients, a mixer into which said liquid batch is dumped, a delivery tube extending between and communicating with both said hopper and said mixer, and means for flushing substantially the entirety of said liquid batch out of said hopper through said delivery tube, and into said mixer with a liquid ingredient.

20. The device of claim 19 wherein said flushing means comprises at least one spray opening positioned at the top of said hopper, said spray opening having means for spraying said flushing liquid ingredient onto the top of said liquid batch as it resides in said hopper.

21. The device of claim 20 wherein said flushing means comprises at least two spray openings positioned to spray said flushing liquid ingredient on opposite sides of said hopper.

22. The device of claim 21 wherein said spray openings include relatively high flow rate spray nozzles and said flushing liquid ingredient has a viscosity substantially low enough so that a substantially large quantity thereof may rapidly flow into said hopper.

23. The device of claim 19 wherein said flushing liquid ingredient is water.

24. The device of claim 23 further comprising means for weighting each of said ingredients comprising said liquid batch as it is fed into said hopper.

25. The device of claim 24 wherein said weighing means comprises a support for said hopper, and at least one load cell connected between said support and said hopper so that as each of said liquid ingredients is fed, individually and separately, into said hopper, the increase in weight thereof corresponds to the weight of the added liquid ingredient.

26. The device of claim 25 further comprising a valve situated at a bottom opening of the hopper and wherein the composition of said liquid batch is such that as said valve is opened said liquid batch fails to freely flow therethrough so that as said water is sprayed into said hopper, said hopper fills with water, and further comprising means for preventing overfilling of said hopper with said water.

27. The device of claim 26 wherein said overfilling preventing means comprises means responsive to said weighing means to thereby monitor and control the maximum amount of weight of liquid ingredients contained in said hopper.

28. In an industrial process system for preparing a liquid batch comprising a large number of servings of a foodstuff, said system including a hopper, means for feeding a measured amount of each of a plurality of liquid ingredients into said hopper to thereby prepare said liquid batch, and a delivery tube communicating between said hopper and a mixer, the improvement comprising means for automatically flushing substantially all of said liquid batch out of said hopper and through said delivery tube into said mixer.

29. The system of claim 28 wherein said flushing means includes means for filling said hopper with a liquid ingredient to thereby create a pressure head for forcing said liquid batch out of said hopper.

30. The system of claim 29 wherein said filling means includes means for spraying the interior of said hopper with said liquid ingredient, said liquid ingredient being a different ingredient from any which comprise the liquid batch.

31. The system of claim 30 further comprising means for preventing the overfilling of said hopper.

32. A process system for preparing a foodstuff, said system including a hopper, a discharge valve in said hopper, means for feeding a measured amount of each of a plurality of liquid ingredients into said hopper to prepare a liquid batch, at least one of said ingredients being water, said ingredient water being fed so that it creates a pressure head tending to force the other of said liquid ingredients out of said hopper prior to the ingredient water so that said hopper is flushed substantially clean by said ingredient water as said discharge valve is opened.

33. The device of claim 32 wherein said hopper is large enough to hold all of said liquid batch including said ingredient water.

34. The device of claim 33 further comprising a discharge tube connecting said hopper to a mixer, said liquid ingredients passing through said discharge tube, and said discharge tube being flushed substantially clean by said ingredient water.

35. The device of claim 34 further comprising means for preventing the overfilling of said hopper.

36. In an industrial process system for preparing a liquid batch comprising a foodstuff, said system including a mixer for mixing a plurality of ingredients comprising said foodstuff, the improvement comprising a hopper connected to said mixer for pre-mixing a plurality of liquid ingredients into said liquid batch, said hopper having means for self-flushing to thereby flush substantially all of said liquid ingredients through said connection into said mixer.

37. In an industrial process system having means for preparing a batch of ingredients for a foodstuff, said batch comprising a large number of serving of said foodstuff, the improvement comprising a hopper for holding a pre-mix of a plurality of ingredients at least some of which are liquid ingredients, said hopper having a discharge, means for feeding a measured amount of each of said ingredients into said hopper, and means for flushing on demand substantially all of said ingredients out of said hopper through said hopper discharge with a liquid ingredient.

38. The device of claim 37 further comprising a delivery tube connected to said hopper discharge for carrying said flushed liquid ingredients to a mixer, said flushing means including means for flushing all of said liquid ingredients through said delivery tube and into said mixer to substantially eliminate the deposition of any residue in said delivery tube.

39. The device of claim 38 wherein said flushing means comprises at least one spray opening situated in said hopper to spray said flushing liquid into said hopper.

40. The device of claim 39 wherein two spray openings are situated in the tope of said hopper, said spray openings being positioned to spray said flushing liquid ingredient across a substantial part of said hopper interior.

* * * * *